United States Patent [19]

Shonkwiler et al.

[11] 4,348,054
[45] Sep. 7, 1982

[54] CONVERTIBLE ADJUSTABLE BED VEHICLE

[76] Inventors: Gary L. Shonkwiler, 942 Beale St., South Bend, Ind. 46616; Forest M. Shonkwiler, 22652 W. Madison Rd., South Bend, Ind. 46614

[21] Appl. No.: 166,444

[22] Filed: Jul. 7, 1980

[51] Int. Cl.³ .............................................. B60P 1/34
[52] U.S. Cl. ...................................... 298/11; 298/14; 298/22 J; 414/471
[58] Field of Search ............... 298/11, 17 SG, 12, 14, 298/22 F, 22 J, 23 F; 414/471, 477, 478, 479

[56] References Cited

U.S. PATENT DOCUMENTS

| 431,064 | 7/1890 | Layton | 298/11 |
| 1,294,798 | 2/1919 | Harvey | 298/11 |
| 1,322,156 | 11/1919 | Wright | 298/11 |
| 2,449,863 | 9/1948 | Ross | 298/11 |
| 3,988,035 | 10/1976 | Corompt | 298/12 |
| 4,015,879 | 4/1977 | Shonkwiler | 298/14 |

Primary Examiner—Trygve M. Blix
Assistant Examiner—Stephen P. Avila
Attorney, Agent, or Firm—Oltsch, Knoblock & Hall

[57] ABSTRACT

An adjustable, tilting vehicle bed which is power actuated and is capable of having its position selectively altered between positions in which it is flat, raised, tilted for dumping a load and tilted to provide a loading ramp.

2 Claims, 11 Drawing Figures

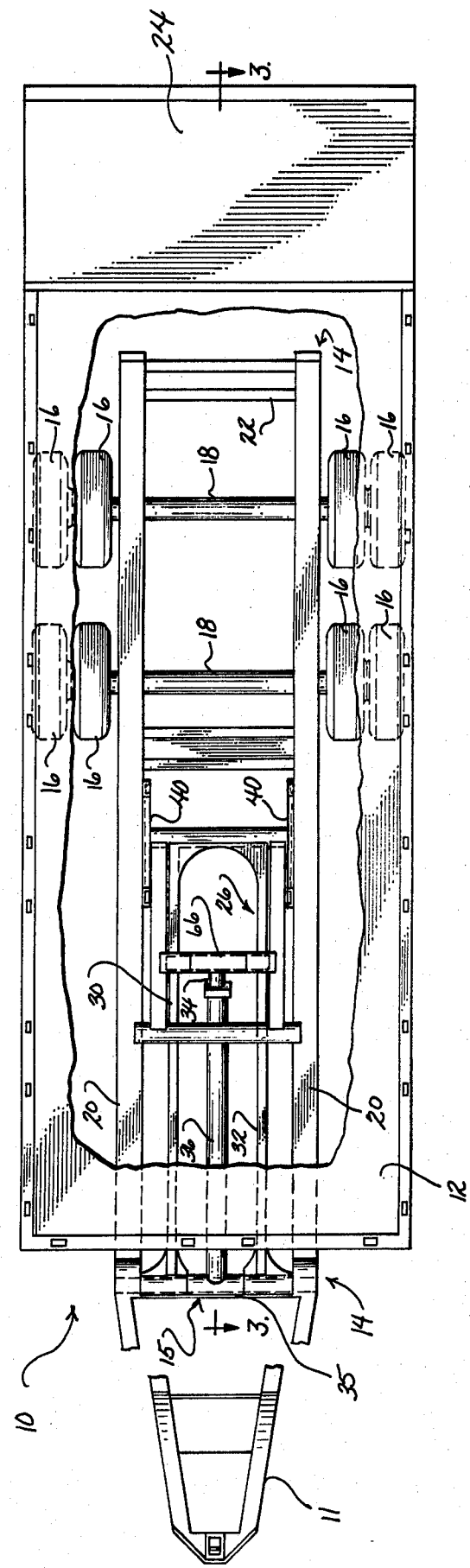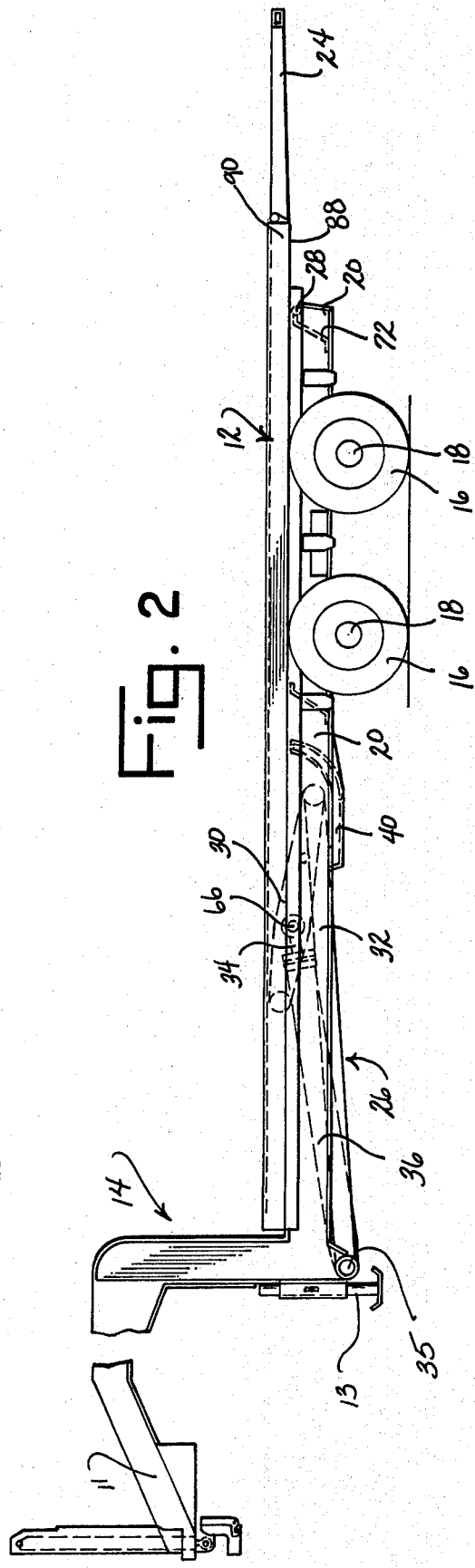

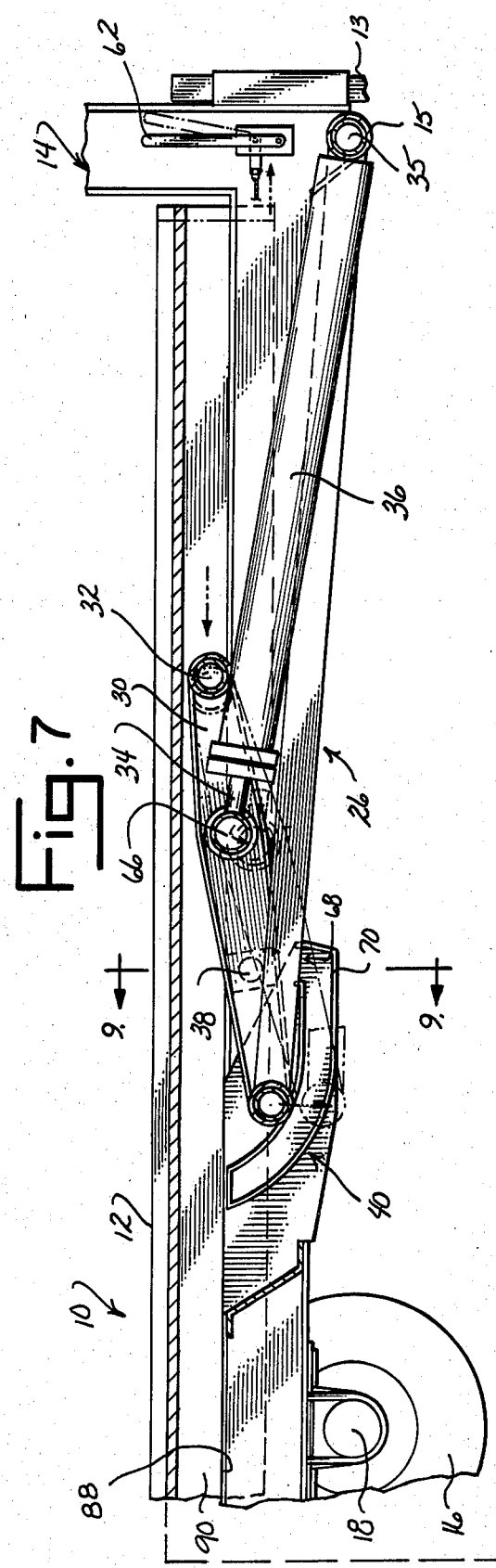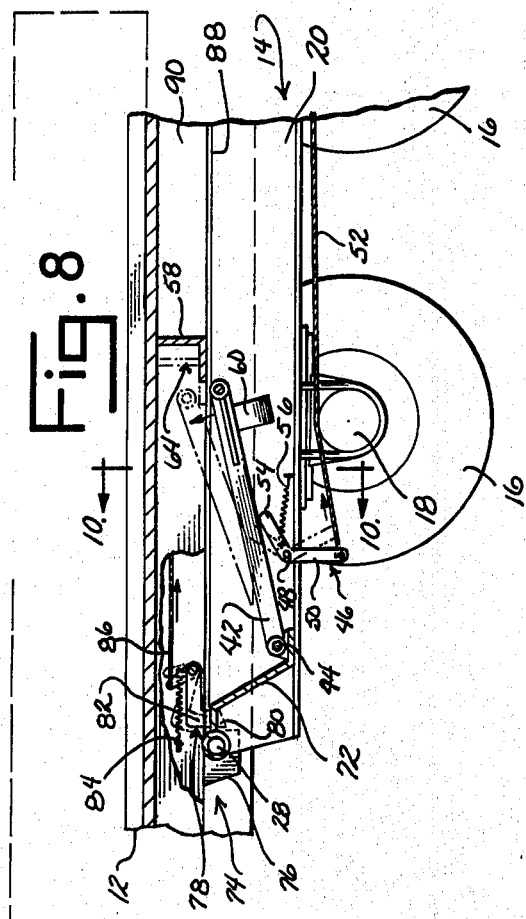

CONVERTIBLE ADJUSTABLE BED VEHICLE

SUMMARY OF THE INVENTION

This invention relates to improvements in adjustable tilting beds for vehicles.

Heretofore adjustable tilting beds for vehicles have generally been limited to those of a dump type truck, those with a longitudinally shiftable bed which moves rearwardly to allow ramp type loading and unloading, and those with the variably tiltable bed described in U.S. Pat. No. 4,015,879. Such tiltable bed vehicles are not capable of lifting the bed vertically while allowing the bed to remain in a substantially horizontal orientation. This type of adjustment is necessary to permit matching the height of the vehicle bed with a loading dock. Usually, if the bed of a vehicle doesn't match up with a dock, it is difficult to carry out loading and unloading procedures. This usually causes a loss of time and an inconvenience in attempting to find a way of transferring a load between a dock and a truck bed.

The present invention is designed to allow for a vertical adjustment of a vehicle bed while maintaining the bed in a substantially horizontal position. Therefore, if the bed of the present invention doesn't align with a loading dock, it can be raised to the level of the dock. Additionally, the vehicle can be readily converted to use in a load carrying position, a dumping position and a ramp position.

Accordingly, it is the primary object of this invention to provide an adjustable vehicle bed which is capable of being adjusted vertically to the level of a loading dock, and adjusted to dumping and ramp-forming positions.

Another object is to provide an adjustable vehicle bed which is capable of being selectively adjusted in multiple different positions.

Another object is to provide an adjustable vehicle bed having rear extension arms which accommodate selectively elevation of a horizontal vehicle bed in co-operation with operation of means for elevating the front of a bed, said rear extension arms being selectively disengaged for tilting the bed.

Other objects will become obvious upon a reading of the following description.

BRIEF DESCRIPTION OF THE DRAWINGS

FIG. 1 is a top plan view of the adjustable bed vehicle with parts broken away.

FIG. 2 is a side view of the vehicle showing bed elevating arms with dotted lines and in retracted position.

FIG. 7 is an enlarged fragmentary vertical longitudinal sectional view of the portion of the front elevating mechanism shown within circle 7 of FIG. 3.

FIG. 8 is an enlarged fragmentary vertical longitudinal sectional view of the portion of the rear elevating mechanism shown within circle 8 of FIG. 3.

DESCRIPTION OF THE PREFERRED EMBODIMENT

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Figure 6:
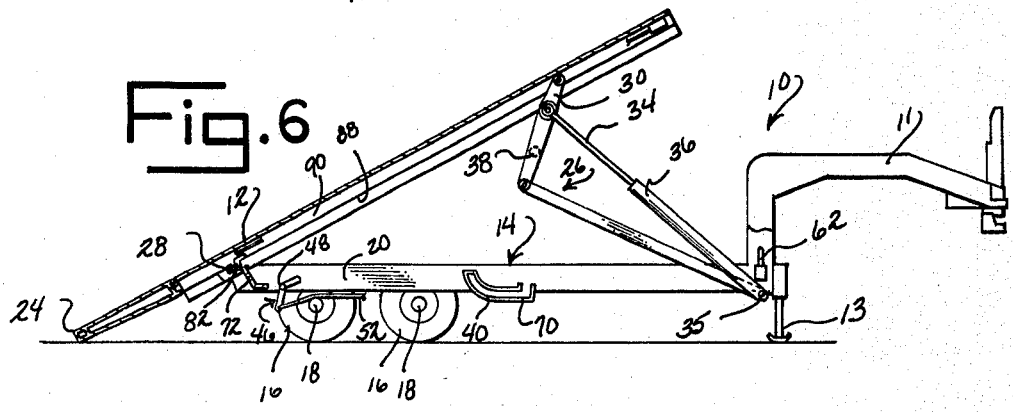
FIG. 6 is a vertical longitudinal cross-sectional view of the vehicle as seen along line 3—3 of FIG. 1 with the bed in a dumping position.
Figure 9:
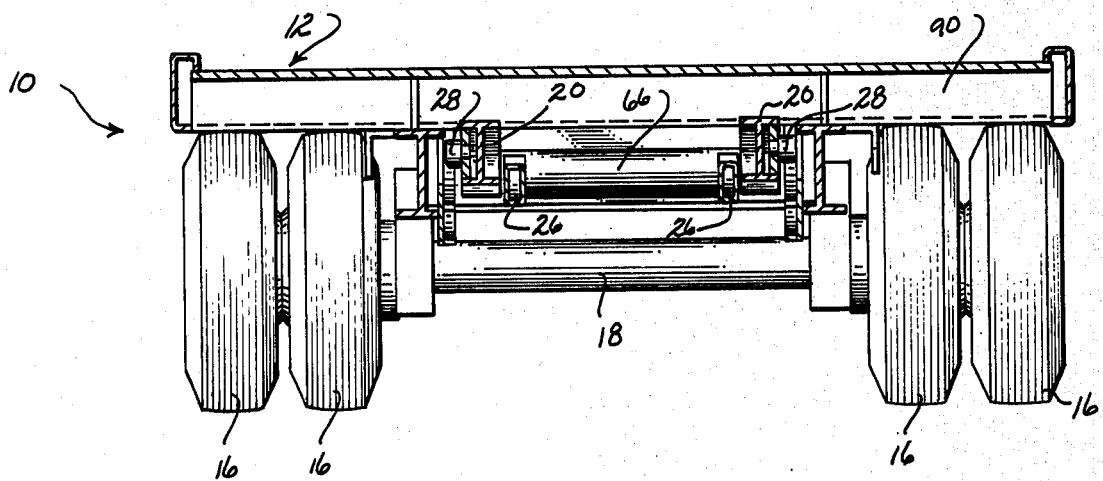
FIG. 9 is a vertical transverse cross-sectional view of the vehicle as seen along line 9—9 of FIG. 7.
Figure 10:
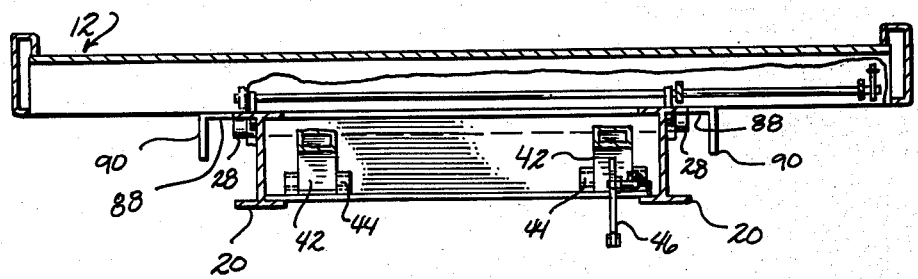
FIG. 10 is a vertical transverse cross-sectional view of the vehicle as seen along line 10—10 of FIG. 8.
Figure 11:
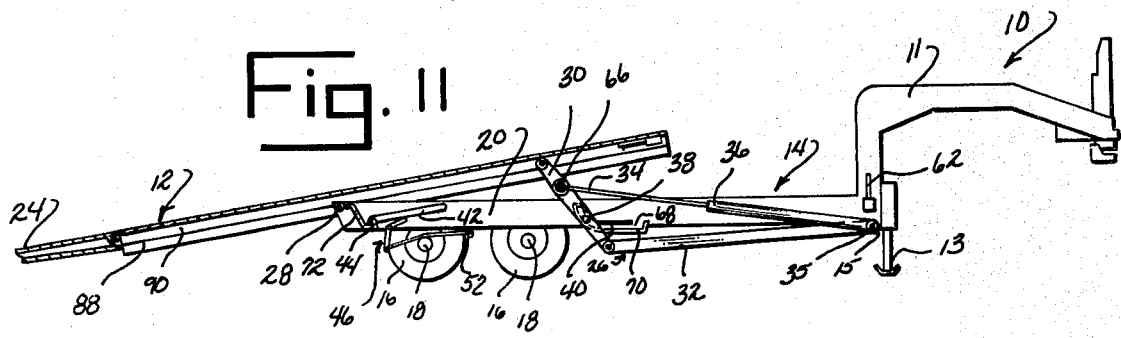
FIG. 11 is a vertical longitudinal cross-sectional view of the vehicle as seen along line 3—3 of FIG. 1 showing the bed in the inclined ramp forming position.

Referring to the drawings, the vehicle illustrated is a trailer 10 with bed 12 and frame 14. While the vehicle illustrated is a gooseneck trailer, it may be a semi-tractor trailer, a truck, or other type of vehicle with a bed supported on a wheeled frame. Vehicle 10 is carried by wheels 16 which are mounted on axles 18. Frame 12 has at least two longitudinal members 20. Longitudinal members 20 are spaced and are connected by cross arms 22. An extension 24 projects rearwardly from and preferably is pivoted to the bed 12. Extension 24 is used to form a retaining gate when in erected position (not shown) or a rear part of a dumping bed as seen in FIG. 6 or as seen in FIG. 11. Gooseneck attachment 11 extends at the front of frame 14 to accommodate connection of vehicle 10 to a truck (not shown). When not connected to a truck, vehicle 10 rests upon an adjustable foot 13 which extends downwardly from the front of frame 14.

Bed 12 normally rests upon frame 14. Frame 14 includes a part 72 which journals rollers 28 at its rear portion, which rollers support bed 12. The front part of bed 12 is connected to the frame 14 by a pair of arms 26 pivoted to the front of the frame 14 and to pivot arms 30 which are pivoted to the front part of the bed 12 at 32. Pivot arms 30 are connected by a transverse member 66 intermediate their ends. Member 66 is connected to the piston 34 of cylinder 36. Power cylinder 36 is attached to the front part of frame 14 at a cross arm 15 to which it is pivoted at 35. Each pivot arm 30 carries a cam follower 38 located between member 26 and the pivot connection of arm 30 with an arm 26. Cam followers 38 are adapted, in one position of the parts as seen in FIG. 5, to fit in cam tracks 40 carried by frame members 20.

Rear arms 42 are affixed to longitudinal frame member 20 at pivot point 44. Arms 42 are preferably of a length equal to the spacing between cam follower 38 and pivot 32 of arms 30. A bell crank 46 is pivoted to longitudinal frame member 20 at 48. The lower arm 50 of crank 46 is attached to a cable 52 and upper arm 54 of the bell crank is attached to a spring 56 which normally urges the bell crank to the full line position shown in FIG. 8. Cable 52 is forwardly connected to a lever 62 mounted at the front end of frame 14. Bed 12 has a transverse angle iron 58 positioned at the bottom thereof and forwardly of rear arm 42. A stop 60 is mounted upon longitudinal frame member 20 and is positioned below the free front end of arm 42. A latch block 74 is positioned on frame 14 adjacent to roller 28. A spring urged latch 78 is pivoted to bed 12. Spring urged latch 78 has a latching detent 80 engageable with latch block 74 and arm 82. Arm 82 is attached to a forwardly extending cable 86 and to a rearwardly extending coil spring 84.

Figure 3:
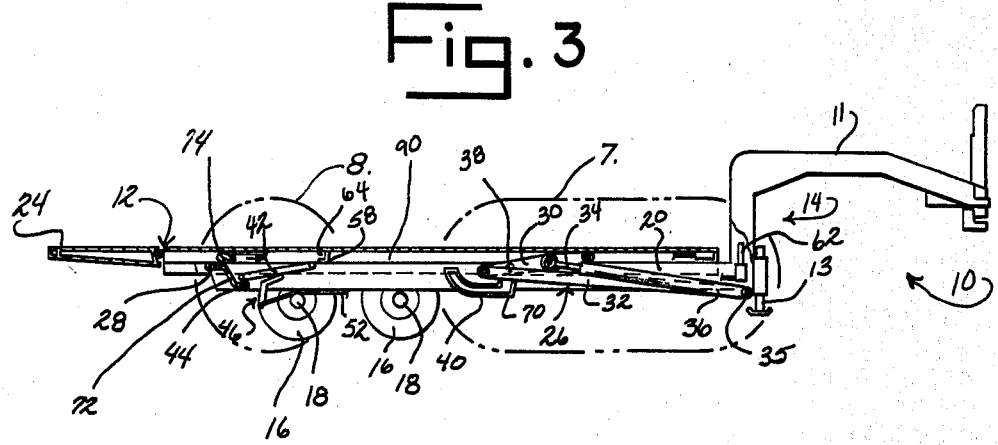
FIG. 3 is a vertical longitudinal cross-sectional view of the vehicle as seen along line 3—3 of FIG. 1 showing the bed in a transport position.

Vehicle 10 is capable of being utilized in four positions: a load carrying position (FIGS. 2-3), an elevated position (FIGS. 4, 5), a dumping position (FIG. 6) and a ramp position (FIG. 11).

Figure 4:
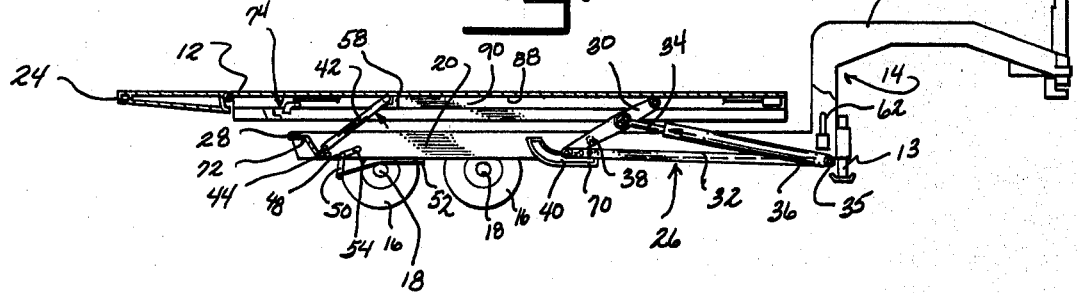
FIG. 4 is a vertical longitudinal cross-sectional view of the vehicle as seen along line 3—3 of FIG. 1 showing the bed in a partly raised position.
Figure 5:
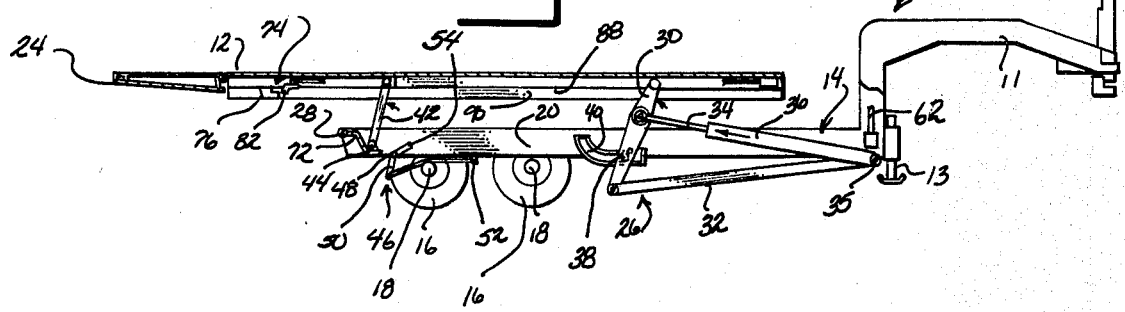
FIG. 5 is a vertical longitudinal cross sectional view of the vehicle as seen along line 3—3 of FIG. 1 with the bed raised higher than in FIG. 4.

To elevate bed 12 from FIG. 2 position to FIG. 4 or FIG. 5 position power cylinder 36 is activated to extend the piston 34 and pivot lever 62 to the position shown in FIG. 4. Simultaneously cable 52 is tensioned by operating the lever 62 to thereby pivot the bell crank 46 and swing upwardly the upper arm 54 of the bell crank and elevate rear support arms 42 to the dotted line position in FIG. 8 when latch 82 has been released. As piston 34 extends it pushes on pivot arm 30 forcing the bed upwardly and rearwardly. As arms 30 pivot to elevate the bed, cam follower 38 lowers into engagement with cam tracks 40. Track 40 limits the downward travel of cam follower 38 as the arms 30 are pivoted by extension of cylinder 36. Front arms 30 are connected to bed 12 and arms 26, and rear arms 42 pivoted to frame 14 and engaging abutment 58 of the bed define a parallelogram. This parallelogram (FIGS. 4 and 5) insures a vertical motion of bed 12 while maintaining substantially horizontal position of the bed.

The movement of bed 12 upwardly and endwise releases latch 74 against the action of spring 84. With latch 74 released, and operation of cylinder 36 continued after reaching FIG. 5 position, the bed 12 shifts to FIG. 11 position wherein cam follower 38 again engages cam track 40 and travels thereacross so that bed 12 moves rearwardly, riding on rollers 28. When extension 24 touches the ground, a ramp forming position is reached. Retraction of cylinder 36 after the load has been moved down the ramp to a delivered position, returns the bed to normal load carrying position.

When the dumping position (FIG. 6) is desired, the latch 74 is controlled to remain locked as cylinder 36 is extended to elevate the front of bed 12. The bed then pivots about roller 28.

It is understood that the invention is not to be limited by the preceding but may be amended within the scope of the appended claims.

What I claim is:

1. In a vehicle having a frame and a bed normally bearing on said frame, said frame having bed supporting rollers at the rear thereof, front arms pivotally connected to the front of said frame, lever arms pivotally connected at opposite ends thereof to said bed and to the free ends of said front arms, extensible power actuated means pivotally connected to the front of said frame and to an intermediate point of said lever arms, the improvement wherein said frame pivotally mounts rear support arms adapted to engage an abutment of said bed at their foreward free ends, a bell crank pivoted to said frame below said rear arms and normally spring urged to accommodate lowering of said rear arms to a position clear of said abutment, selectively operable means for shifting said rear arms into contact with said bed frame adjacent said abutment whereby actuation of said power means elevates said bed with said lever arms and said rear arms substantially defining a parallelogram in combination with said frame and said bed, a releasable latch adjacent said rollers for interconnecting said bed and said frame, and another selectively operable means for releasing said latch.

2. The vehicle of claim 1, wherein a cam track is mounted on said frame and a cam follower is carried by said levers and engageable with said track in selected positions of said levers.

* * * * *